May 2, 1939. J. L. OWEN 2,156,480
RAKE
Original Filed March 13, 1937
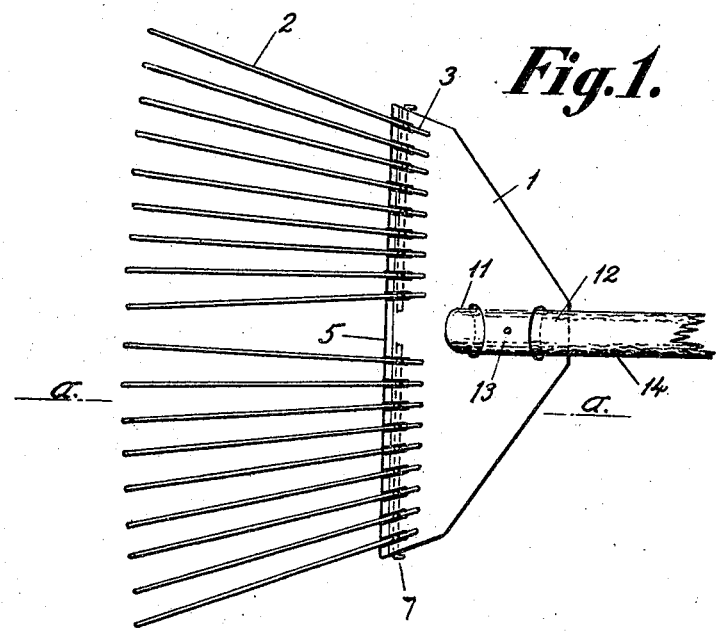
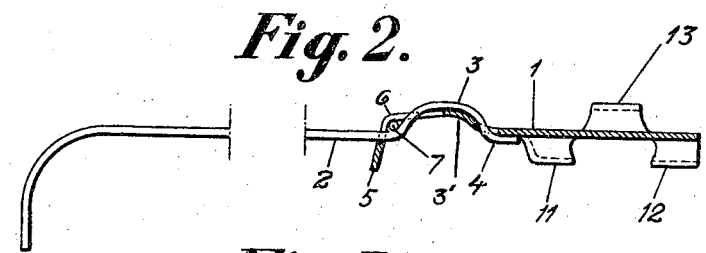
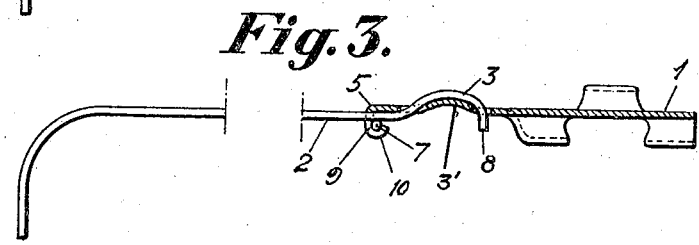
Inventor
James Leander Owen Patented May 2, 1939

2,156,480

UNITED STATES PATENT OFFICE 2,156,480

RAKE

Jonas Leander Owén, Edsbyn, Sweden

Application March 13, 1937, Serial No. 130,639.
Renewed March 23, 1939. In Sweden February 8, 1937

3 Claims. (Cl. 55—114)

This invention relates to improvements in rakes and its object is to produce a rake in which the points of the rake tines lie on a slightly curved line, so that all tines are operating when raking. Another feature is that all the rake tines are easily exchangeable, and the tines are of the same length and shape, which simplifies the production of the rake. The front end of the tines is bent in a curve, which presents the advantage that hay or the like catching thereon easily can be removed by pulling the rake along the ground upside down.

A preferred embodiment of the invention is illustrated in the accompanying drawing, forming part hereof, in which Figure 1 is a diagrammatic plan view showing a fan-shaped rake. Figures 2 and 3 are sectional views on the line a—a of Fig. 1 on enlarged scale showing two different forms of construction.

A plurality of rake tines 2 are exchangeably secured on a rake plate 1. The rear part of the tines is curved to a part 3 bearing tightly against a groove 3' formed in the rake plate.

In the form of construction shown in Fig. 1 the inner end of the tine 2 forms a part 4 parallel thereto, which engages in a hole in the rake plate and bears against the under side of this plate. The tines extend through slots 6 in the front of the groove 3' and in the plate 1 and in the upper side in a flange 5 on the front of the plate 1. The tines are held in position by means of a rod 7 fitted in the angle formed by the flange and the plate bearing against the upper side of the tines.

In the form of construction shown in Fig. 3 the curved inner end of the tine is bent to form a hook 8, which engages in a hole in the rake plate. The front part of the tines engages in a hole in the rake plate and extends through a slot 9 in the lower edge of the flange 5 and bears against the under side of the rake plate and is held in position by means of a rod 7 arranged in hinge like bends 10 on the flange 5. This rod bears against the under side of the tines.

The description shows that the tines in both forms of construction are continually secured against shifting in all directions and can neither turn nor shift laterally as the curved part 3 on the tines bears tightly against the groove 3' on the rake plate.

In the event of a tine breaking and requiring to be removed the rod 7 is pulled out sufficiently far to release the tine in question. To prevent the rod from being pulled out too far, it can be divided into two parts, which are inserted one from each side of the rake plate.

To enable the rake fixing device for the shaft to be made in one piece with the rake plate, two substantially semi-cylindrical sleeves 11, 12 are provided on the one side of the rake plate and another semi-cylindrical sleeve 13 is provided on the reverse side of the rake plate. These sleeves form a socket for the handle 14, which is secured by screws or the like.

What I claim is:

1. A rake comprising in combination a rake plate, having one transversal groove, said rake plate having a flange on the front, slots being arranged in a part of the flange and a part of the groove, holes being arranged behind the groove, tines engaging through the slots and the holes, said tines having a bent front portion and a curved part in the rear portion, said curved portion bearing tightly against the upper side of the unslotted part of the groove, a rod being arranged behind the flange for connecting the tines with said rake plate.

2. A rake as specified in claim 1, in which the slots are arranged in the upper side of the flange and in the front part of the rake plate and in the front part of said groove, said rod bearing against the under side of the rake plate and the upper side of the tines, the inner end of said tines bearing against the under side of the rake plate behind the groove.

3. A rake as specified in claim 1, in which the slots are arranged in the lower side of the flange, the flange having hinge like bent over parts in which the rod is bearing against the under side of the tines, the upper side of the tines bearing against the under side of the front part of the rake plate, the innermost part of the tines being bent to form a hook engaging a hole in the rake plate behind the groove.

JONAS LEANDER OWÉN.